Nov. 6, 1951     G. E. PLATZER     2,574,191
COUPLING DEVICE
Filed Oct. 6, 1949
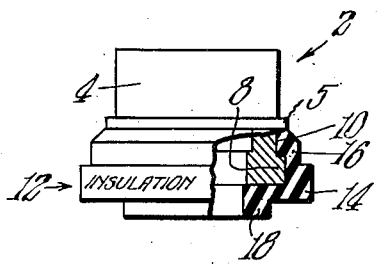
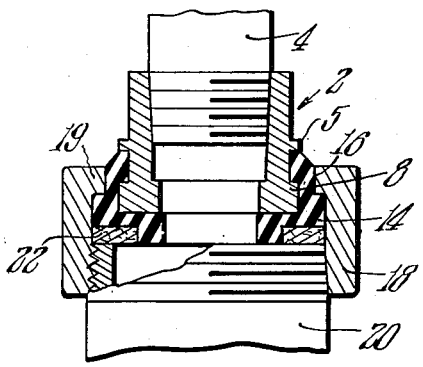
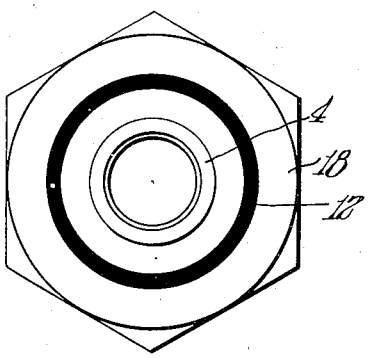
INVENTOR.
George E. Platzer.
BY
Ross & Ross.

Patented Nov. 6, 1951

2,574,191

UNITED STATES PATENT OFFICE 2,574,191

COUPLING DEVICE

George E. Platzer, Springfield, Mass., assignor of one-half to B. C. Daying, Detroit, Mich.

Application October 6, 1949, Serial No. 119,874

1 Claim. (Cl. 285—16)

This invention relates to improvements in pipe coupling devices and is directed more particularly to improvements in insulating devices for connecting pipes in which inflammable liquids or gases are present.

The principal objects of the invention are directed to an insulating coupling for connecting pipes or the like such as the outlet from a gas meter to the supply piping of a gas system.

The novel features of the invention are adapted for many and various uses but for purposes of disclosure the invention will be described in connection with the gas meter of a building which is connected by the novel coupling arrangement to the gas piping of the building.

It is a common practice to ground radio apparatus, such as receivers and the like, to the gas piping, a practice which is dangerous and otherwise objectionable.

Since the object of the grounding is to conduct energy to the ground, it is obvious that leaking gas can be ignited thereby. In many instances, such has been the case and explosions resulting in great damage have occurred. Furthermore with the numerous installations of radio receivers and the like, considerable electrical energy finds its way back to the source of the gas supply which is a condition that is creating hazards and is obviously objectionable.

According to this invention, a coupling device is provided which not only effectively connects piping together but also insulates the members so connected thereby obviating the flow of energy to the ground and overcoming the likelihood of explosions as where a gas meter is connected to the piping of a building.

All of the above objects I accomplish by means of such structure and relative arrangement of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claim hereunto annexed and more fully described and referred to in connection with the accompanying drawings wherein:

Fig. 1 is a side elevational view of the coupling device;

Fig. 2 is a longitudinal sectional view of a coupling device embodying the novel features of the invention; and Fig. 3 is a plan view of the coupling device shown in Fig. 2.

Referring now to the drawings more in detail, the invention will be fully described.

A metal coupling member is represented by 2 which is provided with internal screw threads for threadedly engaging a pipe such as 4.

Said pipe 4 may represent a pipe of a gas system of a building.

The member 2 is provided with an upper annular bead 5 and a lower annular flange 8 between which is an annular groove 10.

An annular bushing 12 is provided around the member 2. This has an annular flange 14, disposed below a neck portion 16 and is provided with a lower tubular portion 18.

The bushing will be formed around the member 2 by a molding operation so as to be integral therewith and will consist of a moldable plastic which is a dielectric nonconductor.

The moldable plastic will preferably be a thermoplastic so as to be moldable and may be one of the group known as polyamide resins, which are known to be dielectrics and suitable for the practice of the invention.

By the molding operation, a bushing 12 will be secured to the member 2, the bead 6 and flange preventing relative endwise movements so that the members 2 and 12 are an integral structure.

The member 2 may be serrated or roughened in any suitable manner to enhance the bonding of said members 2 and 12.

A nut 18 is provided which has an upper inwardly extending annular flange 19 to overlie the flange 14 of the bushing. The lower end of the nut is internally threaded to engage the threaded end of a gas supply member 20 which may be the pipe from a gas meter.

A yieldable sealing washer 22 is provided around the portion 18 of the bushing 12 and may be made from any material such as fiber, rubber, rubber composition or the like which is adapted to yield sufficiently and provide a seal.

The nut 18 is tightened so as to act on the flange 14 of the bushing and bring the washer 22 into intimate sealing contact with the end of pipe 20.

It will be observed that the members 4 and 20 are securely connected but are insulated from one another by means of bushing 12.

The particular material from which the bushing is to be made is to be distinguished from other materials such as porcelain, fiber rubber or the like which crack, splinter and deteriorate generally so as to result in the leakage of electrical energy.

A connecting device such as herein described is adapted to withstand high and low temperatures, say from —20° F. to 160° F., as well as the effects of the components of artificial and natural gases, and is accounted for by the material from which the bushing is made and the fact of its bonding to the coupling which prevents gas leakage therebetween.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claim are therefore intended to be embraced therein.

What it is desired to claim and secure by Letters Patent of the United States is:

A device for coupling and insulating pipes comprising in combination, a unitary coupling member and insulating member, said coupling including an elongated metallic coupling body for connection to a pipe having a longitudinal bore therethrough and provided with a radially outwardly extending annular flange at its lower end and a radially extending annular bead spaced upwardly therefrom intermediate upper and lower ends of said body, said insulating member including a bushing moulded from dielectric material about the lower portion of said coupling member so as to be integral therewith and having an inwardly extending portion tightly embracing the coupling member between the lower flange and upper bead thereof and a radially outwardly extending annular flange intermediate upper and lower portions thereof forming an upper shoulder thereabove extending radially outwardly from a neck portion, a lower portion of said bushing continuing radially inwardly from said flange below the lower end of said coupling member and provided with an axially extending tubular part extending downwardly therefrom having an outer diameter less than that of the flange of said bushing forming a lower shoulder below said flange, a tubular nut surrounding said flange of the bushing having an upper flange extending radially inwardly embracing the neck and overlying the upper shoulder of said bushing, said nut at its lower end provided with internal threads for the threaded end of a pipe, and a yieldably sealing washer tightly embracing the tubular part at the lower end of said bushing and disposed on the lower shoulder thereof for engagement by the end of a pipe in the lower threaded end of said nut.

GEORGE E. PLATZER.

REFERENCES CITED

The following references are of record in the file of this patent:

UNITED STATES PATENTS

| Number | Name | Date |
|---|---|---|
| 2,257,385 | Keegan | Sept. 30, 1941 |

FOREIGN PATENTS

| Number | Country | Date |
|---|---|---|
| 89,677 | Switzerland | Sept. 15, 1920 |